(12) United States Patent
Matsuki

(10) Patent No.: US 11,097,705 B2
(45) Date of Patent: Aug. 24, 2021

(54) ELECTRIC PARKING BRAKE SYSTEM

(71) Applicant: KABUSHIKI KAISHA TOYOTA JIDOSHOKKI, Kariya (JP)

(72) Inventor: Takanori Matsuki, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 219 days.

(21) Appl. No.: 16/380,281

(22) Filed: Apr. 10, 2019

(65) Prior Publication Data
US 2019/0315323 A1    Oct. 17, 2019

(30) Foreign Application Priority Data

Apr. 16, 2018 (JP) .............................. JP2018-078441

(51) Int. Cl.
| | |
|---|---|
| *B60T 8/172* | (2006.01) |
| *B60T 7/12* | (2006.01) |
| *B60T 8/1755* | (2006.01) |
| *B60T 13/74* | (2006.01) |
| *F16D 65/28* | (2006.01) |

(52) U.S. Cl.
CPC ............... *B60T 8/172* (2013.01); *B60T 7/12* (2013.01); *B60T 8/17552* (2013.01); *B60T 13/74* (2013.01); *F16D 65/28* (2013.01)

(58) Field of Classification Search
CPC . B60T 7/107; B60T 7/12; B60T 7/122; B60T 13/662; B60T 13/74; B60T 8/172; B60T 8/17552; B60T 2201/04; F16D 65/28
USPC .......................................................... 701/70
See application file for complete search history.

(56) References Cited

U.S. PATENT DOCUMENTS

| | | | |
|---|---|---|---|
| 7,206,702 B2* | 4/2007 | Isono ...................... | B60T 8/172 701/70 |
| 2008/0071454 A1* | 3/2008 | Shiraki ................... | B60T 7/122 701/70 |
| 2008/0071455 A1* | 3/2008 | Shiraki ................. | B60T 13/746 701/70 |
| 2008/0071456 A1* | 3/2008 | Shiraki .................... | H02P 3/04 701/70 |
| 2008/0071457 A1* | 3/2008 | Shiraki ................... | B60T 7/122 701/70 |

(Continued)

FOREIGN PATENT DOCUMENTS

| | | | |
|---|---|---|---|
| DE | 102015111100 A1 * | 1/2016 | .......... F02N 11/0822 |
| JP | 2004-215447 A | 7/2004 | |

(Continued)

*Primary Examiner* — Atul Trivedi
(74) *Attorney, Agent, or Firm* — Sughrue Mion, PLLC

(57) ABSTRACT

An electric parking brake system includes a wheel driven by an electric motor to move a vehicle, a parking brake maintaining the wheel stopped, a parking brake actuator operating the parking brake, and a drive controller controlling the parking brake actuator. The drive controller controls the electric motor to maintain the wheel of the vehicle stopped while the vehicle is parked, and calculates a parking torque based on a control amount of the electric motor that maintains the wheel stopped. The drive controller calculates a necessary braking force for the parking brake to maintain the wheel stopped based on the calculated parking torque, and controls the parking brake actuator so that the necessary braking force is generated.

4 Claims, 7 Drawing Sheets

(56) References Cited

U.S. PATENT DOCUMENTS

| | | | | |
|---|---|---|---|---|
| 2008/0071458 | A1* | 3/2008 | Fukasawa | B60T 7/122 701/70 |
| 2008/0086252 | A1* | 4/2008 | Nakayama | B60T 7/122 701/80 |
| 2008/0086253 | A1* | 4/2008 | Nakayama | B60T 7/122 701/80 |
| 2008/0185235 | A1* | 8/2008 | Suzuki | B60T 8/32 188/1.11 E |
| 2011/0073419 | A1* | 3/2011 | Matsuzaki | B60T 13/142 188/106 P |
| 2011/0155486 | A1* | 6/2011 | Iwaki | B60L 3/0076 180/65.1 |
| 2011/0241418 | A1* | 10/2011 | Nozawa | B60T 13/586 303/3 |
| 2014/0257643 | A1* | 9/2014 | Dufford | B60T 1/062 701/45 |
| 2015/0066326 | A1* | 3/2015 | Furuyama | B60T 13/146 701/70 |
| 2018/0065629 | A1* | 3/2018 | Wolff | B60L 7/12 |
| 2019/0118784 | A1* | 4/2019 | Yasui | B60T 17/22 |
| 2019/0315323 | A1* | 10/2019 | Matsuki | B60T 7/107 |

FOREIGN PATENT DOCUMENTS

| | | | | |
|---|---|---|---|---|
| JP | 2006-315607 A | | 11/2006 | |
| JP | 2009-079734 A | | 4/2009 | |
| JP | 4376622 B2 | * | 12/2009 | F16D 48/08 |
| JP | 2012-240641 A | | 12/2012 | |
| JP | 2016-011081 A | | 1/2016 | |
| KR | 20160148208 A | * | 12/2016 | |
| WO | WO-2012019408 A1 | * | 2/2012 | B60W 30/18027 |
| WO | WO-2012144065 A1 | * | 10/2012 | B60T 7/042 |
| WO | WO-2014013971 A1 | * | 1/2014 | B60T 7/107 |
| WO | WO-2017047496 A1 | * | 3/2017 | B60T 13/74 |

* cited by examiner

ELECTRIC PARKING BRAKE SYSTEM

CROSS-REFERENCE TO RELATED APPLICATION

This application claims priority to Japanese Patent Application No. 2018-078441 filed on Apr. 16, 2018, the entire disclosure of which is incorporated herein by reference.

BACKGROUND ART

The present disclosure relates to an electric parking brake system.

Referring to FIG. 8, Japanese Patent Application Publication No. 2009-79734 discloses an electric parking brake (corresponding to an electric parking brake system) that includes an electric motor 132 (corresponding to a parking brake actuator), a worm 130SS, a worm wheel 130SL, a parking wire 100W, and a load sensor 134. One end of the worm 130SS is disposed coaxially with and connected to a rotary shaft of the electric motor 132, and the load sensor 134 measuring a load applied to the worm 130SS is disposed at the other end of the worm 130SS. The worm wheel 130SL is engaged with the parking wire 100W. A rotation of the worm 130SS causes a pivotal movement of the worm wheel 130SL, which generates a tractive force of the parking wire 100W, with the result that the parking brake is operated. The load sensor 134 measures the load applied to the worm 130SS by the tractive force generated by the parking wire 100W. The braking force generated by the parking brake is calculated based on the load measured by the load sensor 134.

Japanese Patent Application Publication No. 2016-11081 discloses an electric parking brake control device (corresponding to the electric parking brake 30 system) that includes a liquid pressure sensor detecting a brake fluid pressure of a service brake, a motor driving a parking brake (corresponding to the parking brake actuator), and an controller (corresponding to a drive controller). In this electric parking brake control device, a necessary braking force for maintaining the vehicle stopped is calculated based on information from a liquid pressure sensor while the service brake is being operated by an operator, so that the electric parking brake is actuated based on the calculated braking force so that the necessary braking force is generated.

In the electric parking brake of Japanese Patent Application Publication No. 2009-79734, the braking force required for stopping the vehicle may not be calculated, though the braking force of the parking brake may be estimated by measuring the force of the worm wheel 130SL pulling the parking wire 100W.

In the electric parking brake control device of Japanese Patent Application Publication No. 2016-11081, since the braking force is calculated based on the information from the liquid pressure sensor while the service brake is being operated by the operator, the electric parking brake may be operated at more than required braking force if the service brake is operated at the more than required braking force.

The present disclosure is directed to providing an electric parking brake system with an increased durability which operates at a necessary and appropriate braking force without operating with an excessive braking force.

SUMMARY

In accordance with an aspect of the present disclosure, there is provided an electric parking brake system includes a wheel driven by an electric motor to move a vehicle, a parking brake maintaining the wheel stopped, a parking brake actuator operating the parking brake, and a drive controller controlling the parking brake actuator. The drive controller controls the electric motor to maintain the wheel of the vehicle stopped while the vehicle is parked, and calculates a parking torque based on a control amount of the electric motor that maintains the wheel stopped. The drive controller calculates a necessary braking force for the parking brake to maintain the wheel stopped based on the calculated parking torque, and controls the parking brake actuator so that the necessary braking force is generated.

In accordance with another aspect of present disclosure, there is provided an electric parking brake system including a wheel driven by an electric motor to move a vehicle, a parking brake maintaining the wheel stopped, a parking brake actuator operating the parking brake, an inclination angle detector mounted on the vehicle and detecting an inclination angle of a road surface, and a drive controller controlling the parking brake actuator. The drive controller calculates a torque of the electric motor during an acceleration of the vehicle based on a control amount of the electric motor accelerating the vehicle or a torque of the electric motor during a regenerative control of the electric motor based on a control amount of the electric motor during the regenerative control of the electric motor, and calculates a mass of the vehicle based on the calculated torque, the inclination angle, a change in a vehicle speed of the vehicle. The drive controller calculates a parking torque based on the mass of the vehicle and the inclination angle, calculates a necessary braking force for the parking brake to maintain the wheel stopped based on the calculated parking torque, and controls the parking brake actuator so that the necessary braking force is generated.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure together with objects and advantages thereof may best be understood by reference to the following description of the presently preferred embodiments together with the accompanying drawings in which.

DETAILED DESCRIPTION OF THE EMBODIMENTS

[The Overall Configuration and Processes of the Electric Parking Brake System According to the First Embodiment (FIGS. 1 Through 4)]

Figure 1:
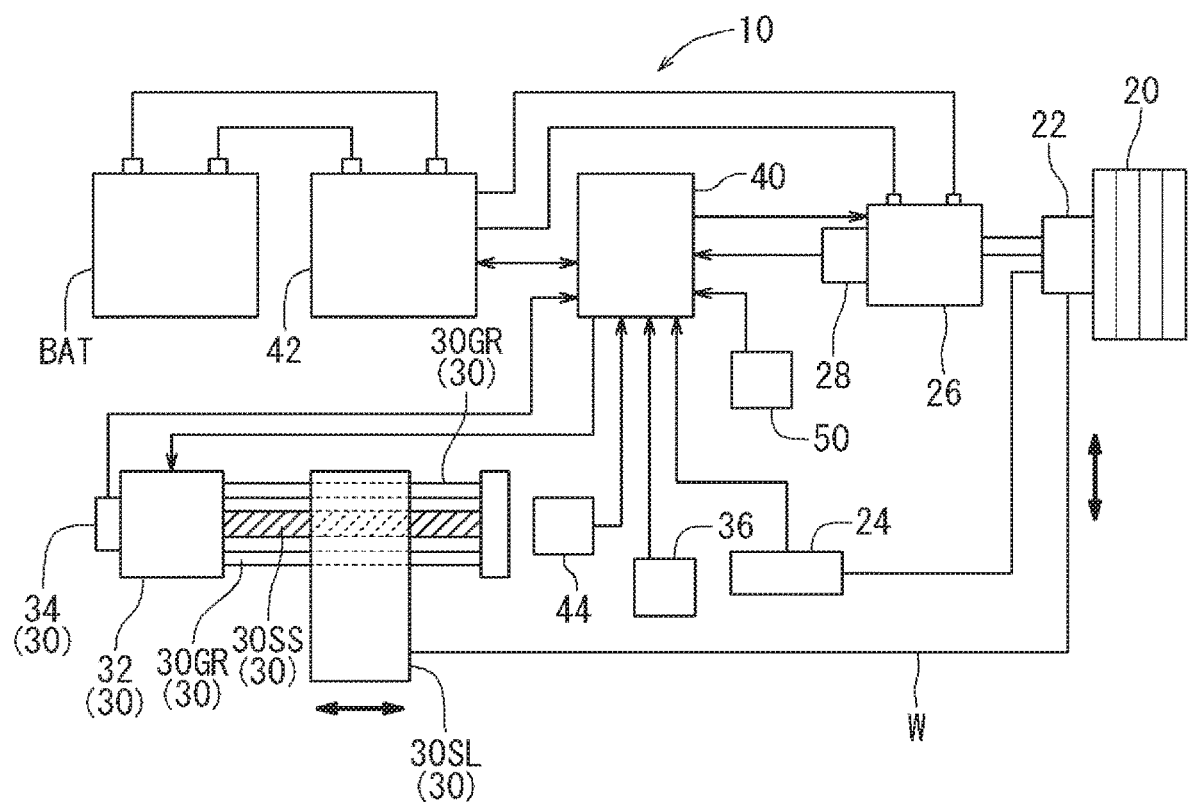
FIG. 1 is a block diagram showing a configuration of an electric parking brake system according to a first embodiment of the present disclosure.
Figure 2:
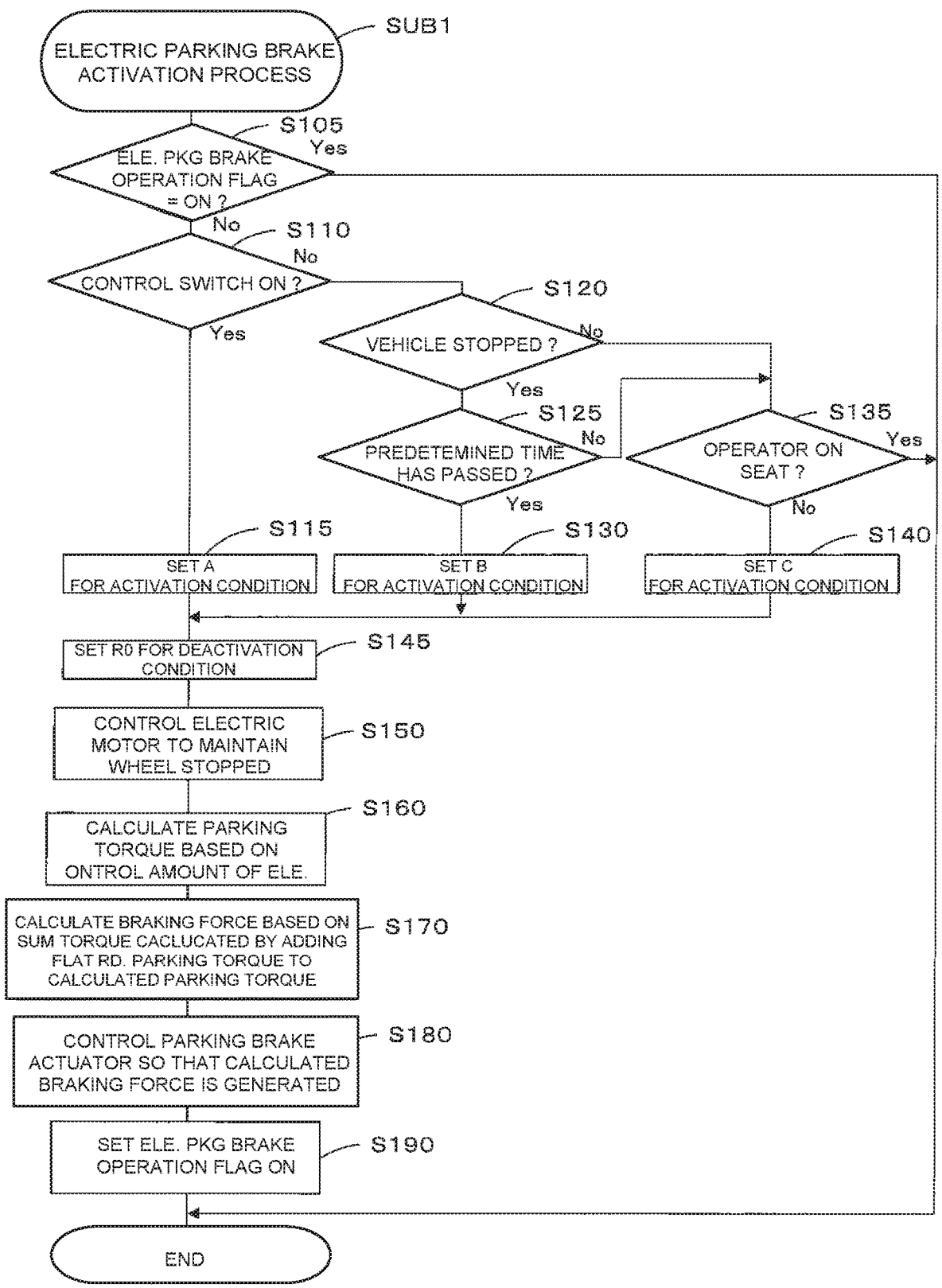
FIG. 2 is a flow chart describing an electric parking brake activation process of the electric parking brake system according to the first embodiment.
Figure 3:
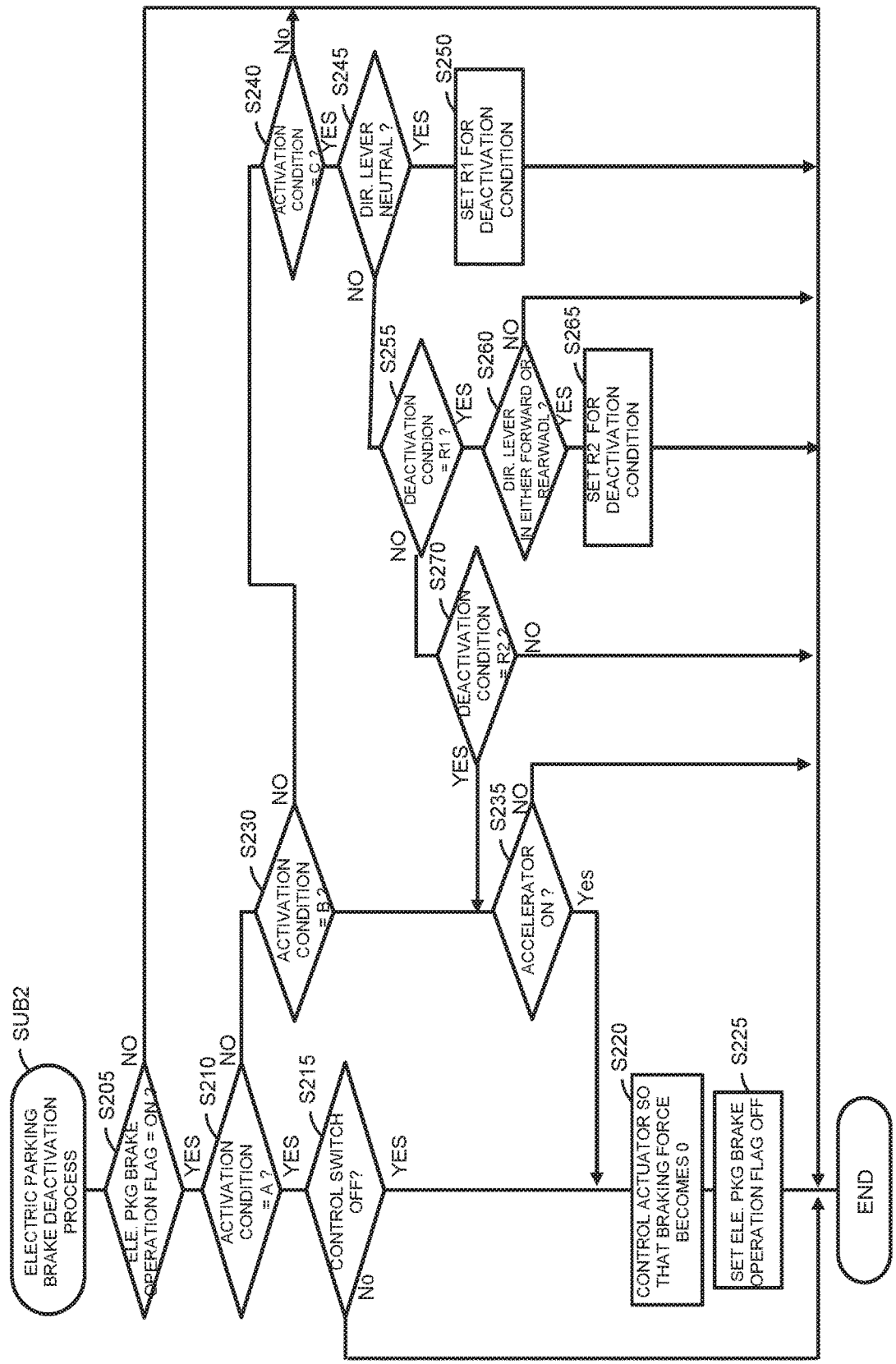
FIG. 3 is a flow chart describing an electric parking brake deactivation process of the electric parking brake according to the first embodiment.
Figure 4:
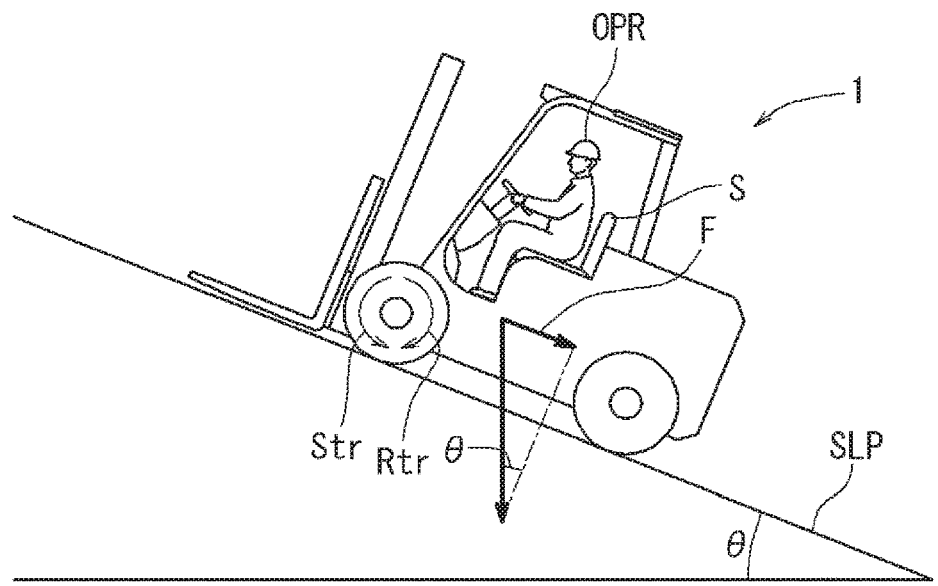
FIG. 4 is a chart describing the operation of the vehicle in which the electric parking brake system is employed.

The following will describe an outline and the overall configuration of an electric parking brake system 10 according to a first embodiment of the present disclosure with reference to FIGS. 1 through 4. FIG. 1 is a block diagram showing the configuration of the electric parking brake system 10 according to the first embodiment. FIGS. 2 and 3 are flow charts describing the processes of the electric parking brake system 10 of FIG. 1 according to the first embodiment. FIG. 4 is a chart for describing the operation of the vehicle to which the electric parking brake system 10 is applied.

As shown in FIG. 1, the electric parking brake system 10 includes a wheel 20, a parking brake 22, a service brake 24, an electric motor 26, a linear movement mechanism 30, a drive controller 40, a motor driver 42, an accelerator 36, an operator detector 44, a control switch 50, and a battery BAT.

The parking brake 22 is a general mechanical brake, and one end of a wire W is connected to the parking brake 22. The parking brake 22 is configured to maintain the wheel 20 stopped by generating a braking force, which causes the braking of the wheel 20, by amplifying the tractive force of the wire W through a mechanism such as a lever mechanism.

The service brake 24 is, for example, a hydraulic brake used in a general vehicle, which pressurizes brake fluid by a force applied to a pedal or the like by the operator to brake the wheel 20. The service brake 24 is connected to the drive controller 40 through a rotation angle detector such as potentiometer (not shown) mounted to the brake pedal, and generates voltage corresponding to the pedal stroke applied by the operator.

The electric motor 26 is operable to drive the wheel 20 and controlled by the drive controller 40. The rotation speed detector 28 is connected to the electric motor 26 and outputs a signal that is indicative of the rotation speed of the electric motor 26 to the drive controller 40. The rotation speed detector 28 is, for example, a rotary encoder.

The linear movement mechanism 30 includes a slider 30SL, a pair of guide rails 30GR, a screw shaft 30SS having male threads on its outer peripheral surface, a parking brake actuator 32 rotating the screw shaft 30SS, and a load sensor 34.

The slider 30SL has a slider through hole which has an inner side surface having female threads which extends generally in the axial direction of the slider 30SL and corresponds to the male threads of the screw shaft 30SS, and a pair of guide rail through holes between which the slider through hole is disposed and through which the guide rails 30GR are inserted, respectively. The slider 30SL moves along the guide rails 30GR in the axial direction thereof by rotating the screw shaft 30SS by the parking brake actuator 32.

As described, the one end of the wire W is connected to the parking brake 22, and the other end of the wire W is connected to the slider 30SL.

The parking brake actuator 32 is, for example, an electric motor, which drives (rotates) the screw shaft 30SS and moves the slider 30SL back and forth along the axial direction of the guide rail 30GR.

The load sensor 34 is connected to the parking brake actuator 32 and outputs a signal that is indicative of the tractive force of the parking brake actuator 32 with the operation (movement) of the slider 30SL to the drive controller 40.

The accelerator 36 is connected to the drive controller 40 and configured to output a signal that is indicative of the depression angle of the accelerator 36 to the drive controller 40.

In the driving operation of the electric motor 26, the motor driver 42 is controlled based on the control signals from the drive controller 40 and converts electric power supplied from the battery BAT to driving electric power, which is then outputted to the electric motor 26. In the regenerative operation of the electric motor 26, the motor driver 42 is controlled based on the control signal 30 from the drive controller 40 and converts regenerative electric power inputted from the electric motor 26 to the charging electric power and outputs such regenerative electric power to the battery BAT.

The operator detector 44 is configured to detect whether or not an operator is seated on the driver seat of the vehicle to which the electric parking brake system 10 is provided. For example, the operator detector 44 is a seating switch that is provided on the driver seat and detects whether the operator is seated on the driver seat or not. The operator detector 44 is turned ON when the operator is seated on the driver seat and turned OFF when the operator leaves the driver seat.

The control switch 50 corresponds to the switch of the electric parking brake system 10 and is connected to the drive controller 40. When the control switch 50 is ON, the electric parking brake system 10 is operated, and when the control switch 50 is OFF, the operation of the electric parking brake system 10 is stopped.

The drive controller 40 calculates the tractive force of the wire W based on a signal from the load sensor 34. The drive controller 40 calculates the braking force Fs generated by the parking brake 22 based on the tractive force produced by the wire W. When applying the braking force to the parking brake 22, the drive controller 40 calculates the tractive force of the wire W based on the braking force Fs required for the parking brake 22 and controls the parking brake actuator 32 so that the calculated tractive force of the wire W is produced.

The following will describe the operation of the electric parking brake system 10 according to the first embodiment with reference to FIG. 4. The vehicle 1 shown in FIG. 4 is an electric vehicle driven by electric power, for example, a forklift truck. The vehicle mass M, i.e., the mass of the vehicle 1, includes the mass of the vehicle body, the mass (weight) of the operator, and the mass of the cargo and the like. In FIG. 4, the vehicle 1 is moving upward on a slope SLP that is inclined at the inclination angle $\theta$.

When the vehicle 1 is moving upward on the slope SLP at the inclination angle $\theta$, a component force F of the gravity (gravitational acceleration g) with respect to the inclination direction (hereinafter referred to as the component force F), is generated in the vehicle 1. Such component force F acts on the wheel 20 of the vehicle 1 and generates the rotation torque Rtr of the wheel 20, which rotates the wheel 20, corresponding to the component force F.

For example, if the operator OPR leaves the driver seat S without operating the parking brake 22 (FIG. 1), the vehicle 1 starts moving along the inclination of the slope SLP with the rotation of the wheel 20 due to the rotation torque Rtr generated by the component force F.

If it is determined that the operator OPR is not on the driver seat S, the electric parking brake system 10 carries out the regenerative control of the electric motor 26 (FIG. 1) to generate the braking torque Str against the rotation torque Rtr of the wheel 20 (FIG. 1), thus stopping the vehicle 1.

The parking torque Ptr corresponds to the braking torque Str of the electric motor 26 that maintains the wheel 20 stopped by controlling the electric motor 26 while the vehicle is parked. The parking torque Ptr is calculated based on the braking torque Str that stops the vehicle 1 and is stored in the drive controller 40 in advance.

The braking force Fs is calculated based on the sum torque that is calculated by adding the flat road parking torque Pftr to the parking torque Ptr. The flat road parking torque Pftr corresponds to the braking torque that is necessary for the wheel 20 to maintain the wheel 20 stopped even in a case in which a specified external force is applied to the vehicle 1 while the vehicle 1 is parked on the flat road. The flat road parking torque Pftr is stored in the drive controller 40 in advance.

The electric parking brake system 10 controls the parking brake 22 so that the braking force corresponds to the braking force Fs is generated. Thus, the electric parking brake system 10 generates the braking force which is required and suitable for parking the vehicle 1 against the component force F to be applied to the vehicle 1.

[The Electric Parking Brake Activation Process and the Electric Parking Brake Deactivation Process According to the First Embodiment (FIGS. 2 and 3)]

FIGS. 2 and 3 are flow charts describing the processes of the electric parking brake system 10 of FIG. 1 according to the first embodiment. The drive controller 40 (FIG. 1) starts the electric parking brake activation process (subroutine SUB1) and the electric parking brake deactivation process (subroutine SUB2) in the main control of the vehicle 1 in which the electric parking brake system 10 is incorporated at a predetermined time interval (e.g., a few-millisecond interval).

The following will describe Steps of the subroutine SUB1 (the electric parking brake activation process) in detail.

At Step S105, if the drive controller 40 determines that the electric parking brake activation flag is not ON (NO at Step S105), the drive controller 40 proceeds to Step S110. If the drive controller 40 determines that the electric parking brake activation flag is ON (YES at Step S105), the drive controller 40 ends the electric parking brake activation process (subroutine SUB1) and returns to the main control of the vehicle 1. The electric parking brake activation flag indicates the operating condition of the system, which is ON if the electric parking brake system 10 is operated and OFF if the electric parking brake system 10 is not operated.

At Step S110, if the drive controller 40 determines that the control switch 50 (FIG. 1) is ON (YES at Step S110), the drive controller 40 proceeds to Step S115. If the drive controller 40 determines that the control switch 50 (FIG. 1) is not ON (NO at Step S110), the drive controller 40 proceeds to Step S120.

At Step S115, the drive controller 40 sets the condition A for the activation condition (activation condition=A), and the drive controller 40 proceeds to Step S145. It is to be noted that the conditions A, B, and C are variables indicating the condition for activating the electric parking brake system 10. The condition A is set for the activation condition if it is determined that the operator OPR turns the control switch 50 ON. The condition B is set for the activation condition if it is determined that the vehicle 1 is continuously stopped for a predetermined time. The condition C is set for the activation condition if it is determined that the operator OPR is not on the driver seat.

At Step S120, if the drive controller 40 determines that the vehicle 1 is parked (YES at Step S120), the drive controller 40 proceeds to Step S125. If the drive controller 40 determines that the vehicle 1 is not parked (NO at Step S120), the drive controller 40 proceeds to Step S135. It is noted that the drive controller 40 determines whether or not the vehicle is parked based on, for example, the information from the rotation speed detector 28, which indicates the rotation of the electric motor 26.

At Step S125, if the drive controller 40 determines that a predetermined period of time has passed since the vehicle 1 stopped (YES at Step S125), the drive controller 40 proceeds to Step S130. If the drive controller 40 determines that the predetermined period of time has not passed since the vehicle 1 stopped (NO at Step S125), the drive controller 40 proceeds to Step S135. The drive controller 40 determines whether or not the predetermined period of time has passed since the vehicle 1 stopped, for example, by comparing the elapsed time from Step S120 at which the drive controller 40 determines that the vehicle is parked with the specific time stored in the drive controller 40 in advance.

At Step S130, the drive controller 40 sets the condition B for the activation condition (activation condition=B), and proceeds to Step S145.

At Step S135, if the drive controller 40 determines that the operator OPR is not on the driver seat based on the information from the operator detector 44 (FIG. 1) (NO at Step S135), the drive controller 40 proceeds to Step S140. If the drive controller 40 determines that the operator OPR is seated on the driver seat (YES at Step S135), the drive controller 40 ends the electric parking brake activation process (subroutine SUB1) and returns to the main control of the vehicle.

At Step S140, the drive controller 40 sets the condition C for the activation condition (activation condition=C), and the drive controller 40 proceeds to Step S145.

At Step S145, the drive controller 40 sets the condition R0 for the deactivation condition (deactivation condition=R0), and the drive controller 40 proceeds to Step S150. The deactivation condition is a variable indicating the fulfillment of the conditions for the deactivation of the operation of the electric parking brake system 10 when the condition C is set for the activation condition. Just after the activation of the electric parking brake system 10, the deactivation condition is set at an initial value (i.e., R0). If the direction lever is positioned at a neutral position, the condition R1 is set for the deactivation condition. If the direction lever is positioned at the forward position or at the backward position while the condition R1 is set for the deactivation condition, the condition R2 is set for the deactivation condition. The direction lever is an operation lever of the vehicle 1, which may be shifted in the forward position (the operation for the forward movement of the vehicle 1), in the neutral position (the operation for neither the forward movement nor the backward movement of the vehicle 1), or the backward position (the operation for the backward movement of the vehicle 1).

At Step S150, the drive controller 40 controls the electric motor 26 (FIG. 1) to maintain the wheel 20 stopped, and the drive controller 40 proceeds to Step S160.

At Step S160, the drive controller 40 calculates the parking torque Ptr based on the control amount of the electric motor 26 (the braking torque Str), and the drive controller 40 proceeds to Step S170. The parking torque Ptr is stored in the drive controller 40 in advance, which is calculated based on the braking torque Str that stops the vehicle 1.

At Step S170, the drive controller 40 calculates the braking force Fs based on the sum torque calculated by adding the flat road parking torque Pftr to the parking torque Ptr calculated at Step S160, and the drive controller 40 proceeds to Step S180.

At Step S180, the drive controller 40 controls the parking brake actuator 32 (FIG. 1) so that the braking force Fs calculated at Step S170 is generated, and the drive controller 40 proceeds to Step S190. The drive controller 40 calculates the tractive force of the wire W based on the braking force required for the parking brake 22 and controls the parking brake actuator 32 to generate the calculated tractive force.

At Step S190, the drive controller 40 sets the electric parking brake operation flag ON (electric parking brake operation flag=ON), ends the subroutine SUB1 (the electric parking brake activation process), and returns to the main control of the vehicle 1.

The following will describe Steps of the electric parking brake deactivation process (subroutine SUB2).

At Step S205, if the drive controller 40 determines that the electric parking brake operation flag is ON (YES at Step S205), the drive controller 40 proceeds to Step S210. If the drive controller 40 determines that the electric parking brake operation flag is not ON (NO at Step S205), the drive controller 40 ends the electric parking brake deactivation process (subroutine SUB2) and returns to the main control of the vehicle.

At Step S210, if the drive controller 40 determines that the activation condition is the condition A (activation condition=A) (YES at Step S210), the drive controller 40 proceeds to Step S215. If the drive controller 40 determines that the operation condition is not the condition A (NO at Step S210), the drive controller 40 proceeds to Step S230.

At Step S215, if the drive controller 40 determines that the control switch 50 is OFF (YES at Step S215), the drive controller 40 proceeds to Step S220. If the drive controller 40 determines that the control switch 50 is not OFF (NO at Step S215), the drive controller 40 ends the electric parking brake deactivation process (subroutine SUB2) and returns to the main control of the vehicle.

At Step S230, if the drive controller 40 determines that the activation condition is the condition B (activation condition=B), the drive controller 40 proceeds to Step S235. If the drive controller 40 determines that the activation condition is not the condition B (NO at Step S230), the drive controller 40 proceeds to Step S240.

At Step S235, if the drive controller 40 determines that the accelerator 36 (FIG. 1) is ON (YES at Step S235), the drive controller 40 proceeds to Step S220. If the drive controller 40 determines that the accelerator 36 is not ON (NO at Step S235), the drive controller 40 ends the electric parking brake deactivation process (subroutine SUB2), and returns to the main control of the vehicle.

At Step S240, if the drive controller 40 determines that the activation condition is the condition C (activation condition=C) (YES at Step S240), the drive controller 40 proceeds to Step S245. If the drive controller 40 determines that the activation condition is not the condition C (NO at Step S240), the drive controller 40 ends the electric parking brake deactivation process (subroutine SUB2) and returns to the main control of the vehicle.

At Step S245, if the drive controller 40 determines that the direction lever is positioned at the neutral position (YES at Step S245), the drive controller 40 proceeds to Step S250. If the drive controller 40 determines that the direction lever is not positioned at the neutral position (NO at Step S245), the drive controller 40 proceeds to Step S255.

At Step S250, the drive controller 40 sets the condition R1 for the deactivation condition (deactivation condition=R1), ends the electric parking brake deactivation process (subroutine SUB2), and returns to the main control of the vehicle.

At Step S255, if the drive controller 40 determines that the deactivation condition is the condition R1 (deactivation condition=R1) (YES at Step S255), the drive controller 40 proceeds to Step S260. If the drive controller 40 determines that the deactivation condition is not the condition R1 (NO at Step S255), the drive controller 40 proceeds to Step S270.

At Step S260, if the drive controller 40 determines that the direction lever is positioned in either the forward position or the rearward position (YES at Step S260), the drive controller 40 proceeds to Step S265. If the drive controller 40 determines that the direction lever is not position in neither the forward position nor the backward position (NO at Step S260), the drive controller 40 ends the electric parking brake deactivation process (subroutine SUB2) and returns to the main control of the vehicle.

At Step S265, the drive controller 40 sets the condition R2 for the deactivation condition (deactivation condition=R2), ends the electric parking brake deactivation process (subroutine SUB2), and returns to the main control of the vehicle 1.

At Step S270, if the drive controller 40 determines that the deactivation condition is the condition R2 (deactivation condition=R2) (YES at Step S270), the drive controller 40 proceeds to Step S235. If the drive controller 40 determines that the deactivation condition is not the condition R2 (NO at Step S270), the drive controller 40 ends the electric parking brake deactivation process (subroutine SUB2), and returns to the main control of the vehicle 1.

At Step S220, the drive controller 40 controls the parking brake actuator 32 so that the braking force becomes 0, and the drive controller 40 proceeds to the Step S225.

At Step S225, the drive controller 40 sets the electric parking brake operation flag OFF (electric parking brake operation flag=OFF), ends the electric parking brake deactivation process (subroutine SUB2), and returns to the main control of the vehicle 1.

[The Overall Configuration and Processes of the Electric Parking Brake System According to the Second Embodiment and the Process Thereof (FIGS. 4 Through 7)]

Figure 5:
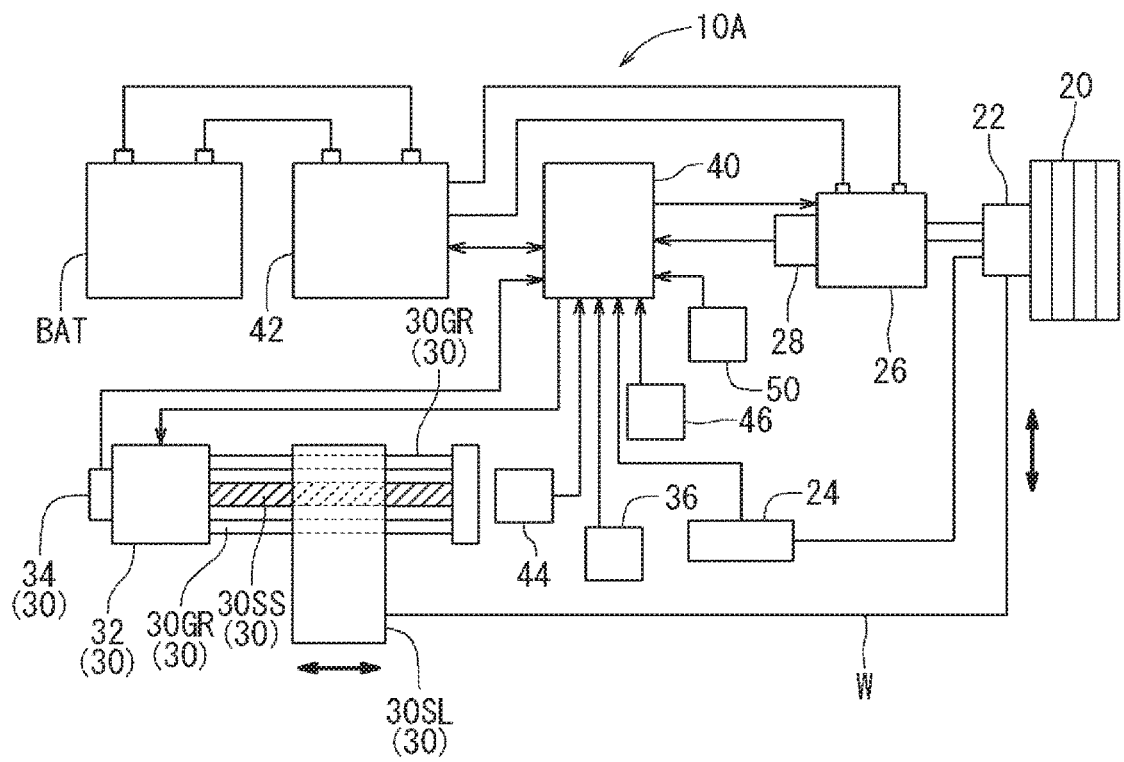
FIG. 5 is a block diagram showing a configuration of an electric parking brake system according to a second embodiment.
Figure 6:
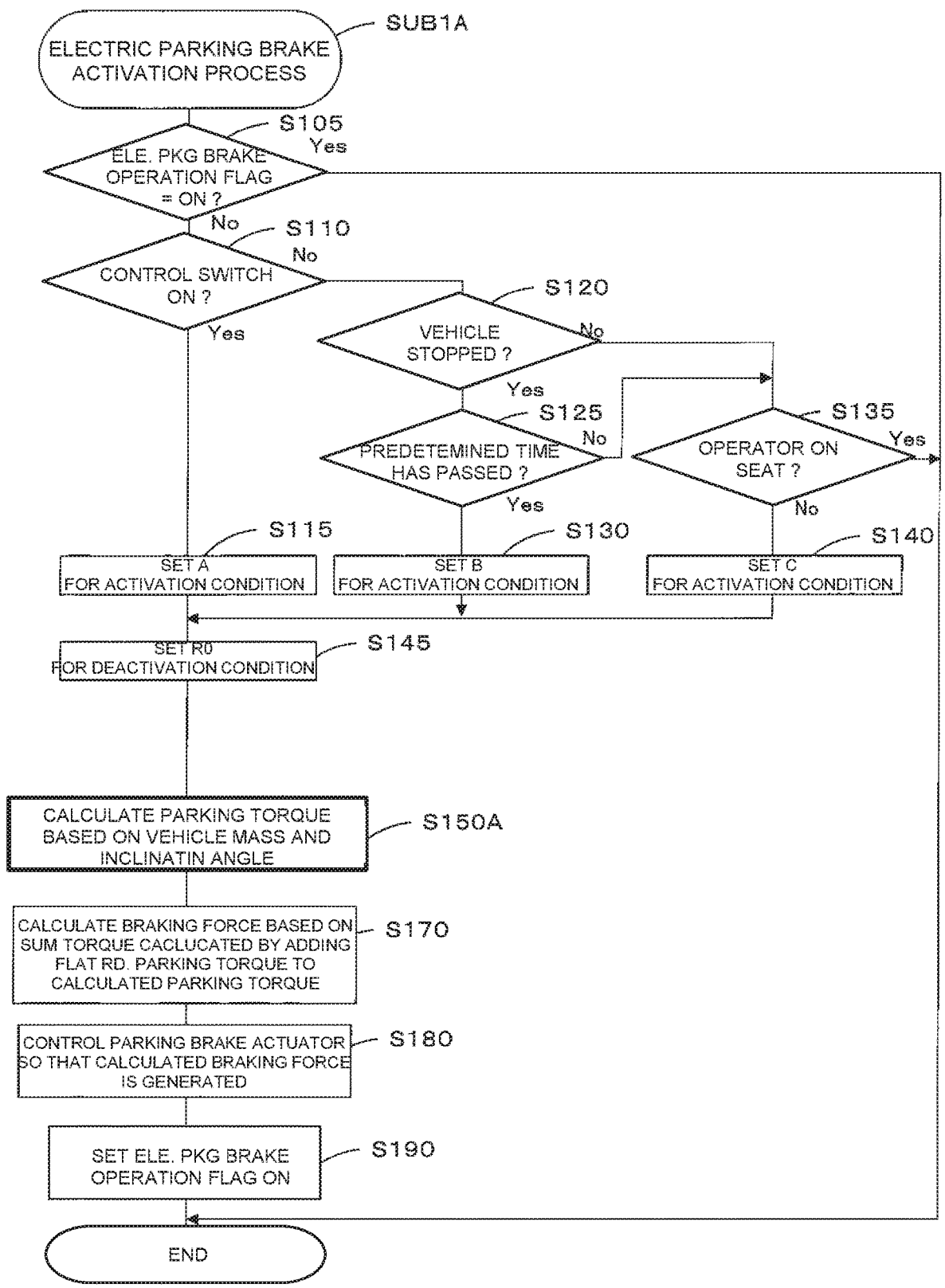
FIG. 6 is a flow chart describing the electric parking brake activation process of the electric parking brake according to the second embodiment.
Figure 7:
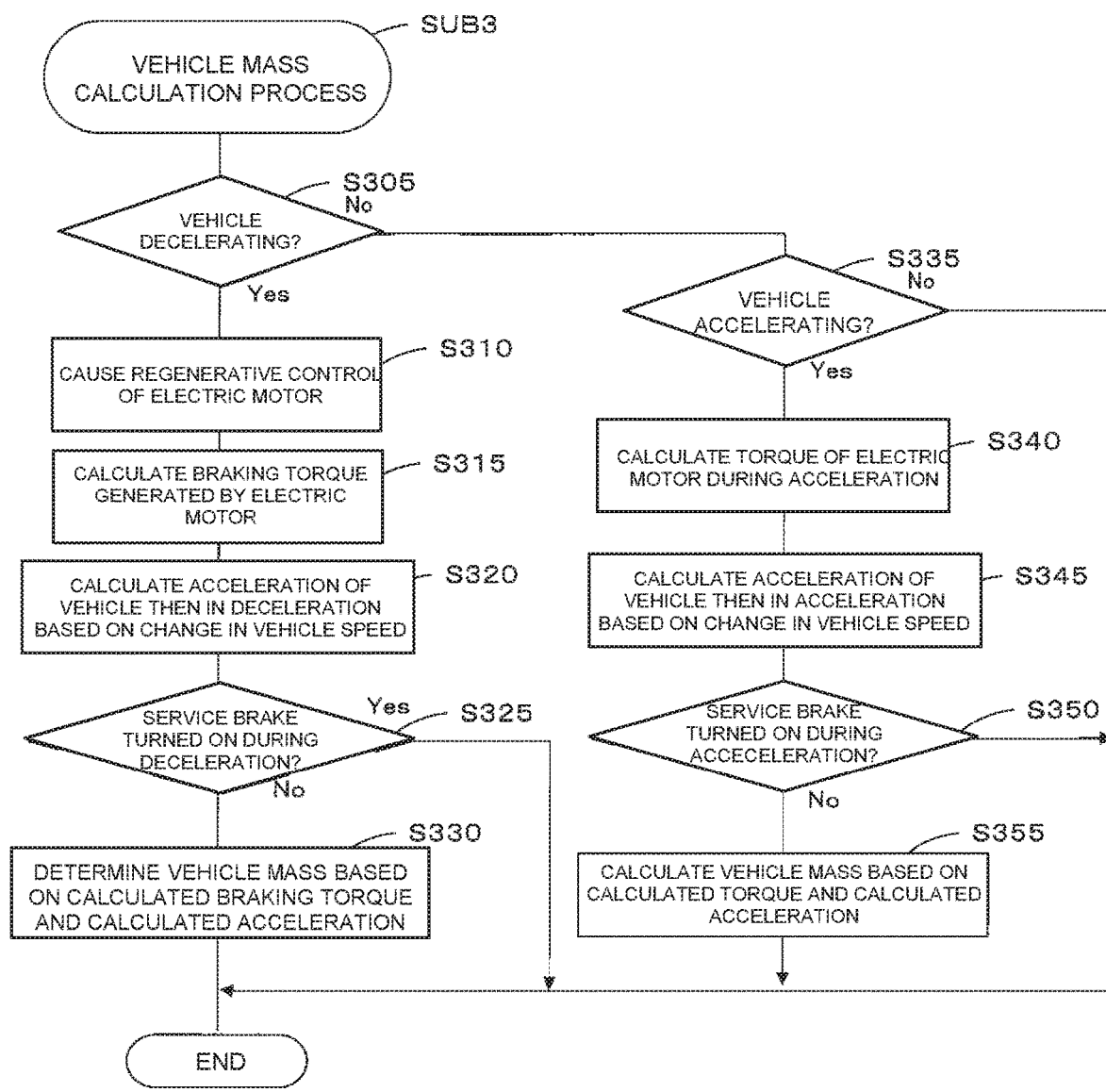
FIG. 7 is a flow chart describing the electric parking brake deactivation process according to the second embodiment.
Figure 8:
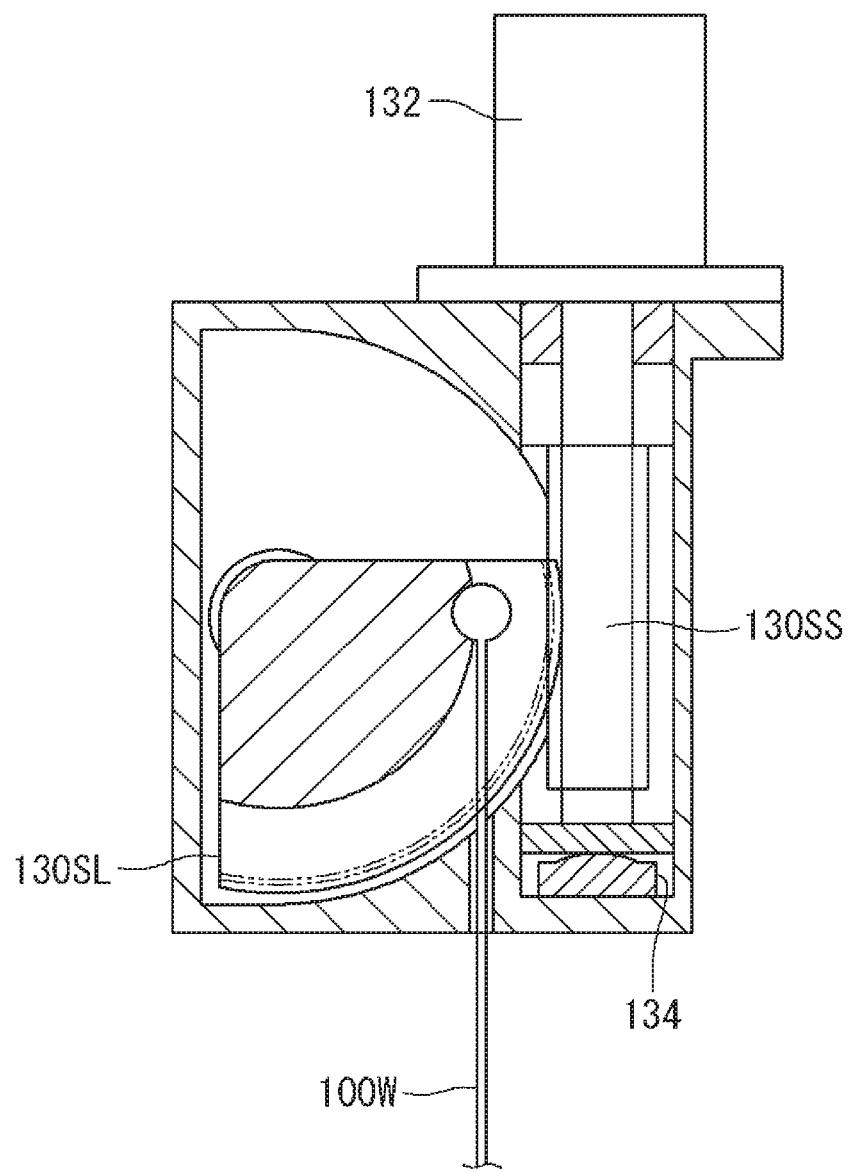
FIG. 8 is a chart showing a conventional electric parking brake device (corresponding to the electric parking brake system).

The following will describe the overall configuration and processes of an electric parking brake system 10A according to the second embodiment of the present disclosure with reference to FIGS. 4 through 7. FIG. 5 is a block diagram showing the configuration of the electric parking brake system 10A according to the second embodiment. FIGS. 6 and 7 are flow charts showing the processes of the electric parking brake system 10A according to the second embodiment.

As shown in FIG. 5, the electric parking brake system 10A according to the second embodiment differs from the electric parking brake system 10 according to the first embodiment in that the electric parking brake system 10A includes an inclination angle detector 46.

The inclination angle detector 46 is mounted on the vehicle 1 and configured to detect the inclination angle of the road surface. The inclination angle detector 46 is, for example, a single axis accelerometer, which calculates the inclination angle of the road surface based on the information of the acceleration applied to the vehicle.

The operation of the electric parking brake system 10A (FIG. 5) according to the second embodiment will be described in detail with reference to FIG. 4. The vehicle mass M, i.e., the mass of the vehicle 1, includes the mass of the vehicle body, the mass (weight) of the operator, and the mass of the cargo and the like. In FIG. 4, the vehicle 1 is moving upward on a slope SLP that is inclined at the inclination angle θ.

In FIG. 4, when the vehicle 1 is moving upward on the slope SLP at the inclination angle θ, the component force F of the gravity (gravitational acceleration g) applied to the vehicle 1 with respect to the inclination direction is the value calculated by the vehicle mass M×the gravitational acceleration g×sine. Such component force F acts on the wheel 20 of the vehicle 1 and causes the wheel 20 (FIG. 5) to generate the rotation torque Rtr to rotate the wheel 20 corresponding to the component force F.

For example, if the operator OPR leaves the driver seat S without operating the parking brake 22 (FIG. 5), the vehicle 1 starts moving along the inclination of the slope SLP by the rotation of the wheel 20 due to the rotation torque Rtr generated by the component force F.

If it is determined that the operator OPR is not on the driver seat S, the electric parking brake system 10A causes the regenerative control of the electric motor 26 (FIG. 5) to generate the braking torque Str of the wheel 20 against the rotation torque Rtr, thus stopping the vehicle 1.

The electric parking brake system 10A calculates the acceleration α of the vehicle 1, which is then in deceleration, from a change in the vehicle speed of the vehicle 1 before and after the braking torque Str is generated. In addition, the vehicle mass M is calculated based on the acceleration α, the braking force corresponding to the braking torque Str, which is stored in the drive controller 40 (FIG. 5) in advance, and the inclination angle θ of the slope SLP.

The component force F is calculated in accordance with an equation, "the component force F=the vehicle mass M×the gravitational acceleration g×sinθ", based on the vehicle mass M and the inclination angle θ. The parking torque Ptr corresponds to the braking torque for generating the braking force of the parking brake 22 to maintain the wheel 20 stopped. The parking torque Ptr is stored in the drive controller 40 in advance and calculated based on the rotation torque Rtr corresponding to the component force F on the slope SLP.

The braking force Fs is calculated based on the sum torque that is calculated by adding the flat road parking torque Pftr to the parking torque Ptr. The flat road parking torque Pftr corresponds to the braking torque that is necessary for the wheel 20 to maintain the wheel 20 stopped even in a case in which a specified external force is applied to the vehicle 1 while the vehicle 1 is parked on the flat road. The flat road parking torque Pftr is stored in the drive controller 40 in advance.

The electric parking brake system 10A controls the parking brake 22 so that the braking force corresponds to the braking force Fs. Thus, the electric parking brake system 10A generates necessary and appropriate braking force to stop the vehicle 1 against the component force F of the gravity on the slope to be applied to the vehicle 1.

[The Electric Parking Brake Activation Process According to the Second Embodiment (FIGS. 6 and 7)]

FIGS. 6 and 7 are flow charts showing the processes of the electric parking brake system 10A (FIG. 5) according to the second embodiment. The drive controller 40 (FIG. 5) starts the electric parking brake activation process (subroutine SUB1A), the electric parking brake deactivation process (subroutine SUB2) (FIG. 3), and the vehicle mass calculation process (subroutine SUB3) in the main control of the vehicle in which the electric parking brake system 10A is incorporated at a regular interval (e.g., a few-millisecond interval).

The subroutine SUB1A of the electric parking brake system 10A according to the second embodiment differs from the subroutine SUB1 of the electric parking brake system 10 according to the first embodiment in that the subroutine SUB1A includes Step S150A instead of Steps S150 through S160 of the subroutine SUB1. It is noted that the electric parking brake deactivation process (subroutine SUB2) is substantially the same as that of the first embodiment, and the description thereof will be omitted.

The following will only describe the difference in the electric parking brake activation process (subroutine SUB1A) and the vehicle mass calculation process (subroutine SUB3).

The following will describe Steps of the subroutine SUB1A (the electric parking brake activation process).

At Step S150A, the drive controller 40 calculates the parking torque Ptr based on the vehicle mass M and the inclination angle θ, and the drive controller 40 proceeds to the Step S170. It is noted that the drive controller 40 calculates the inclination angle θ based on the information from the inclination angle detector 46 (FIG. 5). In addition, the drive controller 40 calculates the component force F by an equation, "the component force F=the vehicle mass M×the gravitational acceleration g×sin θ", based on the vehicle mass M and the inclination angle θ. The drive controller 40 calculates the parking torque Ptr based on the rotation torque Rtr corresponding to the component force F, which is stored in the drive controller 40 in advance.

The following will describe Steps of the subroutine SUB3 (vehicle mass calculation process) in detail.

[The Vehicle Mass Calculation Process while the Vehicle is Decelerating]

At Step S305, if the drive controller 40 determines that the vehicle 1 (FIG. 4) is decelerating based on the information from the rotation speed detector 28 (YES at Step S305), the drive controller 40 proceeds to Step S310. If the drive controller 40 determines that the vehicle 1 is not decelerating (NO at Step S305), the drive controller 40 proceeds to Step S335.

At Step S310, the drive controller 40 causes the regenerative control of the electric motor 26 (FIG. 5), and proceeds to Step S315. It is noted that the regenerative electric power generated by the electric motor 26 is stored in the battery BAT through the motor driver 42 (FIG. 5).

At Step S315, the drive controller 40 calculates the braking torque Str generated by the electric motor 26 based on the current value of the regenerative electric power by the electric motor 26, and proceeds to Step S320. It is noted that the braking torque Str is a value of torque corresponding to the value of electric current of the regenerative electric power, which is stored in the drive controller 40 in advance.

At Step S320, the drive controller 40 calculates the acceleration α of the vehicle 1, which is then in deceleration, based on the vehicle speed V1 of the vehicle 1 before generating the braking torque Str and the vehicle speed V2 of the vehicle 1 after generating the braking torque Str, and the drive controller 40 proceeds to Step S325. The acceleration α is calculated by an equation, "(vehicle speed V2−vehicle speed V1)/time Δt". The drive controller 40 calculates the vehicle speed V1 and the vehicle speed V2 based on the information from the rotation speed detector 28. The time Δt corresponds to the time that it has taken for the vehicle 1 to reduce the vehicle speed from the vehicle speed V1 to the vehicle speed V2.

At Step S325, if the drive controller 40 determines that the service brake 24 (FIG. 5) is not turned ON during the deceleration of the vehicle 1 (NO at Step S325), the drive controller 40 proceeds to Step S330. If the drive controller 40 determines that the service brake 24 (FIG. 5) is turned ON during the deceleration of the vehicle 1 (YES at Step S325), the drive controller 40 ends the vehicle mass calculation process (subroutine SUB3), and returns to the main control of the vehicle.

At Step S330, the drive controller 40 determines the vehicle mass M based on the acceleration α, the braking force Fm corresponding to the braking torque Str, which is stored in the drive controller 40 in advance, and the inclination angle θ of the slope SLP, ends the vehicle mass calculation process (subroutine SUB3), and returns to the main control of the vehicle 1. It is to be noted that the vehicle mass M is calculated in accordance with a "vehicle mass M calculating process", which will be described later.

[The Vehicle Mass Calculation Process During the Acceleration of the Vehicle]

The vehicle mass M may be calculated during the acceleration of the vehicle from the torque of the electric motor 26 and a change in the vehicle speed during the acceleration, similarly to the vehicle mass calculation process during the deceleration of the vehicle 1 by the regenerative braking of the vehicle 1. The following will describe Steps of such calculation in detail.

At Step S335, if the drive controller 40 determines that the vehicle 1 (FIG. 4) is accelerating (YES at Step S335) based on the information from the rotation speed detector 28, the drive controller 40 proceeds to Step S340. If the drive controller 40 determines that the vehicle 1 (FIG. 4) is not accelerating (NO at Step S335), the drive controller 40 ends the vehicle mass calculation process (subroutine SUB3) and returns to the main control of the vehicle 1.

At Step S340, the drive controller 40 calculates the torque Trq of the electric motor 26 during the acceleration, and the drive controller 40 proceeds to Step S345.

At Step S345, the drive controller 40 calculates the acceleration α of the vehicle 1, which is then in acceleration, based on the vehicle speed V1 of the vehicle 1 before the torque Trq is generated and the vehicle speed V2 of the vehicle 1 after the torque Trq is generated, and the drive controller 40 proceeds to Step S350. The acceleration α is calculated by an equation, "(vehicle speed V2−vehicle speed V1)/time Δt". The drive controller 40 calculates the vehicle speed V1 and the vehicle speed V2 based on the information from the rotation speed detector 28. The time Δt corresponds to the time that it has taken for the vehicle 1 to increase the vehicle speed from the vehicle speed V1 to the vehicle speed V2.

At Step S350, if the drive controller 40 determines that the service brake 24 (FIG. 5) is not turned ON during the acceleration of the vehicle 1 (NO at Step S350), the drive controller 40 proceeds to Step S355. If the drive controller 40 determines that the service brake 24 (FIG. 5) is turned ON during the acceleration of the vehicle 1 (YES at Step S350), the drive controller 40 ends the vehicle mass calculation process (subroutine SUB3) and returns to the main control of the vehicle.

At Step S355, the drive controller 40 calculates the vehicle mass M based on the acceleration α, the acceleration force Fa corresponding to the torque Trq, which is stored in the drive controller 40 in advance, and the inclination angle θ of the slope SLP, ends the vehicle mass calculation process (subroutine SUB3), and returns to the main control of the vehicle. It is to be noted that the vehicle mass M is calculated in accordance with the following "the vehicle mass M calculating process".

[The Vehicle Mass M Calculation Process]

The following will describe the procedure of the vehicle mass M calculation process at Steps S330 and S355 with reference to FIG. 4. For example, when the vehicle 1 moves on the slope SLP while either accelerating or decelerating, a force applied to the vehicle 1 is a resultant force calculated by combining either the acceleration force Fa by the electric motor 26 (FIG. 5) accelerating the vehicle 1 or the braking force Fm decelerating the vehicle 1 and the component force F (the vehicle mass M×the gravitational acceleration g×sinθ). This resultant force generates the acceleration α in the vehicle 1 having the vehicle mass M.

The following will describe how to calculate the vehicle mass M in various combinations of the road conditions (the upward slope, the downward slope, and neither the upward slope nor the down ward slope) and the driving conditions of the vehicle 1 (deceleration and acceleration). In the following description, the acceleration force, the braking force, the inclination angle of the slope SLP, the acceleration of the vehicle 1, and the component force F are set as |Fa|, |Fm|, θ, |α|, and M×|g·sin θ|, respectively.

[Road Condition: Neither Upward Slope Nor Downward Slope, and Driving Condition of Vehicle 1: Deceleration]

In this case, |g·sin θ| becomes 0, which results in |Fm|=M×|α|. The vehicle mass M is calculated by an equation, $$M=|Fm|/|\alpha| \quad \text{(Equation 1)}$$

[Road Condition: Neither Upward Slope Nor Downward Slope, and Driving Condition of Vehicle 1: Acceleration]

In this case, |g·sin θ| becomes 0, which results in |Fa|=M×|α|. The vehicle mass M is calculated by an equation, $$M=|Fa|/|\alpha| \quad \text{(Equation 2).}$$

[Road Condition: Upward Slope, and Driving Condition of Vehicle 1: Deceleration]

In this case, the braking force Fm is a force directed upward on the slope SLP, which result in (|Fm|+M×|g·sin θ|)=M×|α|. The vehicle mass M is calculated by an equation, $$M=|Fm|/(|\alpha|-|g\cdot\sin\theta|) \quad \text{(Equation 3).}$$

[Road Condition: Downward Slope, and Driving Condition of Vehicle 1: Deceleration]

In this case, the braking force Fm is a force directed downward on the slope SLP, which result in (|Fm|−M×|g·sin θ|)=M×|α|. The vehicle mass M is calculated by an equation, $$M=|Fm|/(|\alpha|+|g\cdot\sin\theta|) \quad \text{(Equation 4).}$$

[Road Condition: Upward Slope, and Driving Condition of Vehicle 1: Acceleration]

In this case, the acceleration force Fa is a force directed upward on the slope SLP, which results in (|Fa|−M×|g·sin θ|)=M×|α|. The vehicle mass M is calculated by an equation, $$M=|Fa|/(|\alpha|+|g\cdot\sin\theta|) \quad \text{(Equation 5).}$$

[Road Condition: Downward Slope, and Driving Condition of Vehicle 1: Acceleration]

In this case, the acceleration force Fa is a force directed downward on the slope SLP, which results in (|Fa|+M×|g·sin θ|)=M×|α|. The vehicle mass M is calculated by an equation, $$|Fa|/(|\alpha|-|g \cdot \sin \theta|) \quad \text{(Equation 6)}.$$

The drive controller 40 determines the road condition and the drive condition of the vehicle 1 based on the information from the rotation speed detector 28 and the inclination angle detector 46, and calculates the vehicle mass M by using one of the above-described Equations 1 through 6.

[Effects of the Present Disclosure]

The following will describe the operation effect of the present disclosure. As described, the necessary and suitable braking force of the parking brake is calculated and the electric parking brake is operated so that such braking force is generated. This may prevent applying excessive load to component parts, so that the durability may be increased.

The electric parking brake system is not limited to the above-described configuration, structure, and the like, but may be modified within the scope of the present disclosure. Although the electric parking brake system is to be applied to the electric forklift truck in the above-described embodiments, the present disclosure is applicable to any electric vehicle driven by an electric motor. The activation conditions and deactivation conditions of the electric parking brake in the above-described embodiments are examples and not limited to the above-described conditions.

Although, at Step S170 (FIGS. 2 and 6), the braking force Fs is calculated based on the sum torque that is calculated by adding the flat road parking torque Pftr to the parking torque Ptr, the value calculated by multiplying the parking torque Ptr by a specified value k (>1) may be used, instead of adding the flat road parking torque Pftr. In such case, the specified value k (e.g., 1.1) is stored in the drive controller 40 in advance.

What is claimed is:

1. An electric parking brake system comprising:
a wheel driven by an electric motor to move a vehicle;
a parking brake maintaining the wheel stopped;
a parking brake actuator operating the parking brake; and
a drive controller controlling the parking brake actuator, wherein
the drive controller controls the electric motor to maintain the wheel of the vehicle stopped while the vehicle is parked, and calculates a parking torque based on a torque of the electric motor that maintains the wheel stopped, and
the drive controller calculates a necessary braking force for the parking brake to maintain the wheel stopped based on the calculated parking torque, and controls the parking brake actuator so that the necessary braking force is generated.

2. The electric parking brake system according to claim 1, wherein
a flat road parking torque that maintains the wheel stopped even if a specified external force is applied to the vehicle when the vehicle is parked on a flat road is stored in the drive controller in advance, and
when calculating the braking force based on the calculated parking torque, the drive controller calculates the braking force based on a sum torque calculated by adding the flat road parking torque to the calculated parking torque.

3. An electric parking brake system comprising:
a wheel driven by an electric motor to move a vehicle;
a parking brake maintaining the wheel stopped;
a parking brake actuator operating the parking brake;
an inclination angle detector mounted on the vehicle and detecting an inclination angle of a road surface; and
a drive controller controlling the parking brake actuator, wherein
the drive controller calculates a torque of the electric motor during an acceleration of the vehicle based on a control amount of the electric motor accelerating the vehicle or a torque of the electric motor during a regenerative control of the electric motor based on a control amount of the electric motor during the regenerative control of the electric motor, and calculates a mass of the vehicle based on the calculated torque, the inclination angle, a change in a vehicle speed of the vehicle, and
the drive controller calculates a parking torque based on the mass of the vehicle and the inclination angle, calculates a necessary braking force for the parking brake to maintain the wheel stopped based on the calculated parking torque, and controls the parking brake actuator so that the necessary braking force is generated.

4. The electric parking brake system according to claim 3, wherein
a flat road parking torque that maintains the wheel stopped even if a specified external force is applied to the vehicle when the vehicle is parked on a flat road is stored in the drive controller in advance, and
when calculating the braking force based on the calculated parking torque, the drive controller calculates the braking force based on a sum torque calculated by adding the flat road parking torque to the calculated parking torque.

* * * * *